(12) United States Patent
Ashrafi

(10) Patent No.: US 10,757,330 B2
(45) Date of Patent: Aug. 25, 2020

(54) DRIVER ASSISTANCE SYSTEM WITH VARIABLE IMAGE RESOLUTION

(71) Applicant: Conti Temic microelectronic GmbH, Nuremberg (DE)

(72) Inventor: Mina Ashrafi, Neu-Ulm (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 51 days.

(21) Appl. No.: 16/077,896

(22) PCT Filed: Mar. 22, 2017

(86) PCT No.: PCT/EP2017/056879
§ 371 (c)(1),
(2) Date: Aug. 14, 2018

(87) PCT Pub. No.: WO2017/174362
PCT Pub. Date: Oct. 12, 2017

(65) Prior Publication Data
US 2019/0356850 A1    Nov. 21, 2019

(30) Foreign Application Priority Data

Apr. 4, 2016 (EP) .................................. 16163626

(51) Int. Cl.
*H04N 5/77* (2006.01)
*H04N 5/232* (2006.01)
(Continued)

(52) U.S. Cl.
CPC ..... *H04N 5/23245* (2013.01); *G06K 9/00805* (2013.01); *G06K 9/00818* (2013.01);
(Continued)

(58) Field of Classification Search
CPC .. H04N 5/23245; H04N 5/77; G06K 9/00805; G06K 9/00818; G06K 9/00791; B60R 11/04; B60R 2300/105
(Continued)

(56) References Cited

U.S. PATENT DOCUMENTS 7,706,502 B2 * 4/2010 Bueno .................. G01V 5/0016
378/19
2008/0204585 A1 * 8/2008 Meisenzahl ............ H04N 5/347
348/303
(Continued)

FOREIGN PATENT DOCUMENTS

EP          1 033 694      9/2000
WO    WO 2015/072272      5/2015

OTHER PUBLICATIONS

Mody et al, Image signal processing for front camera based automated driver assistance system (Year: 2015).*
(Continued)

*Primary Examiner* — Shan E Elahi
(74) *Attorney, Agent, or Firm* — W. F. Fasse

(57) ABSTRACT

The invention relates to recording images with variable resolution for a driver assistance system (101) of a vehicle (100). The driver assistance system (101) comprises a camera (102). In the standard operation mode, the camera (103) is configured to iteratively switch between recording images of a first type and images of a second type with a higher resolution than the images of the first type. In this way, the images of the first type can be used for analyzing a near-range of the vehicle environment without requiring too much computing power. Moreover, the images of the second type have a sufficient resolution for analyzing a far-range of the vehicle environment.

12 Claims, 2 Drawing Sheets

(51) Int. Cl.
*G06K 9/00* (2006.01)
*B60R 11/04* (2006.01)

(52) U.S. Cl.
CPC ............... *H04N 5/77* (2013.01); *B60R 11/04* (2013.01); *B60R 2300/105* (2013.01)

(58) Field of Classification Search
USPC .......................................................... 348/148
See application file for complete search history.

(56) References Cited

U.S. PATENT DOCUMENTS

| | | | | |
|---|---|---|---|---|
| 2008/0298546 | A1* | 12/2008 | Bueno ................... | G01V 5/0016 378/57 |
| 2012/0002053 | A1* | 1/2012 | Stein ................. | G08G 1/096783 348/148 |
| 2013/0131921 | A1* | 5/2013 | Uhlmann ................ | B61L 29/24 701/36 |
| 2013/0142390 | A1* | 6/2013 | Othmezouri ............ | G06T 7/251 382/103 |
| 2013/0229524 | A1* | 9/2013 | Vovkushevsky ...... | G06T 3/4038 348/148 |
| 2015/0003683 | A1 | 1/2015 | Grewe et al. | |
| 2015/0080725 | A1* | 3/2015 | Wegner .................. | A61B 8/14 600/440 |
| 2015/0116493 | A1* | 4/2015 | Bala ................... | G06K 9/00281 348/148 |
| 2016/0307054 | A1 | 10/2016 | Takemura et al. | |

OTHER PUBLICATIONS

PCT, International Search Report of the International Searching Authority for International Application PCT/EP2017/056879, dated Jun. 12, 2017, 2 pages, European Patent Office, HV Rijswijk, Netherlands.
PCT, PCT Written Opinion of the International Searching Authority for International Application PCT/EP2017/056879, dated Jun. 12, 2017, 9 pages, European Patent Office, HV Rijswijk, Netherlands.
PCT, PCT Written Opinion of the International Preliminary Examining Authority for International Application PCT/EP2017/056879, dated Mar. 16, 2018, 7 pages, European Patent Office, HV Rijswijk, Netherlands.
PCT, PCT International Preliminary Report on Patentability for International Application PCT/EP2017/056879, dated Jun. 22, 2018, 16 pages, International Bureau of WIPO, Geneva, Switzerland.
European, Extended European Search Report for European Patent Application No. 16163626.1, dated Sep. 16, 2016, 10 pages, European Patent Office, Munich, Germany.
Wenxian Hong, "A Study of Fast, Robust Stereo-Matching Algorithms", Thesis, M.S. Mechanical Engineering, Massachusetts Institute of Technology, May 21, 2010, pp. 1 to 117, XP055114594.

* cited by examiner

DRIVER ASSISTANCE SYSTEM WITH VARIABLE IMAGE RESOLUTION

FIELD OF THE INVENTION

The invention relates to recording images with variable resolutions for a driver assistance system. In particular, the invention relates to a driver assistance system, a vehicle, a method, a program element and a computer-readable medium.

BACKGROUND INFORMATION

Modern vehicles, for example automobiles and trucks, can be equipped with driver assistance systems for assisting the driver of the vehicle in different traffic situations. Such driver assistance systems can comprise forward looking cameras that are, for example, used for a range of different functions such as for lane detection, traffic sign recognition and for other functions.

EP1033694A2 describes that a rear-view monitor for use in vehicles is provided, in which contained are vehicle-mounted image pickup means for picking up images of road in the rear of one's own vehicle at every fixed time; and detection means for detecting an overtaking vehicle by processing road images obtained by the image pickup means. The monitor keeps monitoring of relative movement between one's own vehicle and the overtaking vehicle detected by the detection means. The monitor is characterized in that the image pickup means contain a wide-angle high resolution camera, and the detection means include: first image processing means for processing the whole road images obtained by the image pickup means by sampling image data; second image processing means for processing a part of road images obtained by the image pickup means without sampling image data; and selection means for selecting either the first image processing means or the second image processing means in response to a situation of traffic. Thus, a rear-view monitor for use in vehicles enables monitoring over a wide range, i.e. the far and near distances, under preferable conditions.

Nowadays, driver assistance systems have to deal with a great amount of data. However, the computing power available to the driver assistance system is limited. Due to the limited computing power the resolution of images recorded with the cameras of the driver assistance system has to be limited.

SUMMARY OF THE INVENTION

It is an object of the invention to provide an improved driver assistance system. In particular, an object of the invention may be seen in providing a driver assistance system with a more reliable object detection.

This object is solved by the subject-matter of the broadest aspects of the invention. Further optional embodiments and advantageous features of the invention are also disclosed.

A first aspect of the invention relates to a driver assistance system for a vehicle. The driver assistance system comprises a camera for recording images of a vehicle environment. The camera is configured for recording images of a first type of the vehicle environment in a first recording mode and is configured for recording images of a second type of (only) a section of the vehicle environment in a second recording mode. Furthermore, the camera is configured to record the images of the second type in a higher resolution than the images of the first type. At this point, resolution is to be understood as the measure of pixels per centimeter or pixel density. Thus, the second type of image has a higher density of pixels per centimeter compared to the first type. Moreover, the camera is configured to automatically switch between the first recording mode and the second recording mode.

The gist of the invention may be seen in providing a driver assistance system with a camera having a variable or dynamic sensor resolution. This can be provided in that the standard operating mode of the camera comprises at least two recording modes, the first recording mode for recording images with a lower resolution and the second recording mode for recording images with a higher resolution. In the standard operating mode the camera can be configured to iteratively switch between the first recording mode and the second recording mode. In other words, the camera switches between the first and second recording modes, i.e., the camera can record images of the first type and images of the second type iteratively. In this way, images of the first type with a lower resolution are provided, that do not require as much computing power as if the pixel density was kept at the high rate, i.e., the second type images. Furthermore, images of the second type with a higher pixel density are provided, which allow for a more detailed object detection of small areas of interest of the image, for example, in an area around the vanishing point (far-range of the vehicle environment). Thus, the present invention provides both, an optimization of the computing power and reliable object detection. This will be explained in the context of further specified embodiments hereinafter.

The driver assistance system takes account of the fact that most of the algorithms used for providing driver assistance are computationally intensive such that much processing power can be needed. The inventors have recognized that it is advantageous to limit the resolution of the recorded images in order to reduce the needed processing power. However, the inventors have also recognized that for certain targets, which are for example located far ahead on the road, i.e. in an area around the vanishing point, a higher pixel count, for example 4 megapixels or higher, is required for providing a reliable driver assistance. The provided driver assistance system further takes account of the knowledge that most of the targets at close distances such as lane information and information relating to vehicles traveling at a distance of less than 10 for example, will approach the driver's vehicle at high rates. Therefore, information from close objects needs to be processed at high speeds. However, objects that are located farther away, for example cars traveling at a distance greater than 20 m or traffic signs or objects located at a far end of the road, get closer to the vehicle at a much lower proportional rate. In order to achieve reliable object detection, higher resolution images are required for such objects.

The driver assistance system can also be known under the term of an advanced driver assistance system (ADAS). The vehicle can be a road vehicle, for example a motor vehicle, an automobile, a truck or a bus. The camera can be understood by the skilled person as a sensor device for recording image data. For example, the camera can be a digital camera and can be configured for recording images in the optical spectrum and/or in the infrared spectrum. Moreover, the camera can be a front looking camera of the vehicle that is configured for recording images of a front area of the vehicle. The vehicle environment can be understood as a surrounding area of the vehicle. Hereby, the camera does not need to be configured for recording images of the entire vehicle environment. For example, the camera can be configured for recording images of an area of the vehicle environment.

The images of the first type recorded by the camera can hereby refer to first image data. For example, the images of the first type can refer to a majority, especially to at least three of first type images. Moreover, the process of recording images can refer to the process of reading out the image data from the camera. For example, the camera can comprise an image sensor with a plurality of pixels and the process of recording the image can refer to the process of reading out the pixels of the image sensor. The recording of the images of the second type of only a section of the vehicle environment can be performed in such a way that only image data for the section of the vehicle environment is read out from the camera. However, it can also be understood that an image of the vehicle environment is read out from the camera and that the image of the second type of the section of the vehicle environment is extracted from the image. In the context of the present invention, the images of the second type can cover only a part of the vehicle environment recorded by the images of the first type. In other words, the images of the second type can cover only a partial section of the environment covered by the images of the first type Thus, the images of the second type can comprise a zoomed section of the images of the first type. As a result, the images of the second type have a higher resolution but the same byte size and hence require a similar computing power as the first type. The recording of the images of the first type in lower resolution than the images of the second type can be achieved by recording the images of the first type in a binned mode of the camera, i.e. by jointly evaluating a plurality of pixels of the image sensor of the camera. The recording of the images of the second type in the higher resolution can be performed in a non-binned mode of the camera, wherein the pixels of the image sensor of the camera are separately individually read out. In other words, the images of the first type can be binned images.

In one given frame, one or more smaller areas of the image of the first type can be selected by the algorithm for images of the second type, which will record the pixel information in full pixel density from the subsequent or the same frame. The possibility of having more than one area for images of the second type could be used for example to detect two traffic signs in different areas of the image or a traffic sign and the vanishing point or a cluttered region together.

The recording of the images of the first type and of the second type can take place during the standard operation mode of the camera. The camera can iteratively record images of the first type and of the second type. In other words, the recording of the images of the first type and of the second type can be executed in a predetermined way and/or according to predetermined intervals. For example, the camera can be configured such that every 20th image is an image of the second type and the remaining images are images of the first type. However, this is only an example. The invention does not have to be restricted to this exact way of recording images of the first and second type.

Moreover, the driver assistance system can also be configured to analyze the images of the first and second type and to provide driver assistance on the basis of the images of the first and second type.

A driver assistance system as generally described in the context of the invention is exemplarily shown in FIG. 1.

Examples of images of the first type are shown in FIGS. 2A and 3 and an example of an image of the second type is shown in FIG. 2B.

In this way, the driver assistance system with the camera with a dynamic image resolution is provided. Moreover, it is provided that images of the first type are recorded such that the driver assistance system can quickly react to events occurring close to the vehicle, i.e. in a near range of the vehicle. Moreover, it is also provided that images of the second type are recorded with a higher resolution such that the driver assistance system can also recognize objects located farther away from the vehicle, i.e. in the far-range of the vehicle or close to the vanishing point, and can reliably react to such objects. Thus, an improved driver assistance system with more reliable object detection is provided.

Thus, the driver assistance system of the present invention is configured to automatically zoom into a partial area of the images that are recorded in the first mode by the camera and to take the next image or images with a higher resolution in the second, zoomed mode. The system then automatically switches back into the first, normal mode.

According to an exemplary embodiment of the invention, not more than every $3^{rd}$ image recorded by the camera is an image of the second type. In other words, only every Xth image recorded by the camera is an image of the second type, wherein X is greater or equal to 3. Preferably X can be greater or equal to 5.

For example, the 1st to 5th images recorded by the camera are images of the first type and only the 6th image is an image of the second type (i.e. for one iteration). In other words, most of the frames recorded by the camera can be recorded with a lower resolution, e.g. by recording binned images, and only every 10th frame or less is used for recording images of the second type. Moreover, the number of images of the first type between two images of the second type does not have to be the same for every iteration. For example, the number of images of the first type between two images of the second type can be dynamically varied depending on the traffic situation. For example, the camera can be configured for recording an image of the second type once a second. In other words, the camera can be configured for recording images of the first type and images of the second type iteratively, wherein most of the time images of the first type are recorded. In this way, it is provided that enough images are recorded for observing a near-range of the vehicle environment (i.e. close to the vehicle), where events can occur quickly. However, it is also provided that images are recorded in a higher resolution for analyzing a far-range of the vehicle environment.

According to an exemplary embodiment of the invention, the camera comprises an image sensor having a plurality of pixels, wherein the pixels are arranged into groups and wherein each group comprises at least two pixels. Furthermore, the camera is configured to jointly evaluate the pixels of each group for recording the images of the first type. Moreover, the camera is configured to separately evaluate the pixels of each group recording the section of the surrounding of the vehicle for recording the images of the second type.

In other words, the camera can be configured to operate in a binned mode when recording images of the first type. In other words, the images of the first type can be binned images. In order to record the images of the first type, the pixels of each group of the image sensor can be jointly read out. However, image data can also be separately read out of the pixels of each group, wherein the image data is merged together for each group for creating the binned image of the first type, which can be further processed by the driver assistance system. For recording the images of the second type, the camera can be configured to separately read out each pixel of each group. Hereby, it is possible that only the pixels of the groups recording the section of the surrounding of the vehicle are read out. In other words, the pixels of the groups which are not used for recording the section of the surrounding of the vehicle do not need to be read out.

According to another exemplary embodiment of the invention, the driver assistance system is configured to automatically determine the section of the surrounding of the vehicle.

In other words, the standard operation mode of the driver assistance system can also comprise the automatic determination of the section of the surrounding of the vehicle for recording the images of the second type. In this way, a driver assistance system is provided such that it automatically records images of the first type for mainly observing the near range and images of the second type mainly for observing the far-range and also automatically determines which section of the surrounding of the vehicle has to be recorded for the images of the second type.

In the following examples are given on how the section of the vehicle environment can be determined for recording images of the second type.

The section of the vehicle environment for second type images can be an area where an object detection algorithm has failed to detect or has a higher uncertainty in object detection. In this case, a higher pixel density will help to repeat the object detection algorithm with a higher accuracy.

One common area of the image which requires a better resolution is the area around the vanishing point, where the road and the relevant objects such as traffic light or traffic signs become smaller and hence the object detection is more challenging.

Another example is detection of far pedestrians in an urban background for pedestrian detection algorithm. In high detail urban scenes, having a second type image which cover a high clutter areas of the image can help to detect the pedestrians in due time.

According to another exemplary embodiment of the invention, the driver assistance system is configured to automatically determine one or more areas around vanishing point of the vehicle environment and is configured to determine the section such that the distant area is at least partly covered by the section.

In the context of the invention, a close/near-range can be less than 20 m, less than 50 m or less than 100 m distant from the vehicle.

In other words, the driver assistance system is configured to automatically record images of the second type comprising at least partly a far-range of the vehicle environment. In this way, the driver assistance system is configured to automatically select a section of the vehicle environment for recording images of the second type, for which section a higher resolution is usually required.

According to another exemplary embodiment of the invention, the driver assistance system is configured to determine the section in such a way that the section is located around a vanishing point of a road on which the vehicle is driving.

The camera can be configured for automatically determining the road on which the vehicle is driving. The vanishing point can be for example be determined by extrapolating borders of the road. Moreover, the driver assistance system can be configured to extrapolate the borders of the road and to determine cross point of the extrapolated border of the road and of a horizon recorded by the camera. In this way, the driver assistance system can automatically determine the section where a high resolution is required.

According to another exemplary embodiment of the invention, the driver assistance system is configured to analyze a size of a target vehicle in an image recorded by the camera and to determine the section in such a way that the section is located around the target vehicle, if the size of the target vehicle is smaller than a first threshold value.

The target vehicle can be understood as an adjacent vehicle. The target vehicle can also relate to another vehicle being present in the forward looking area of the camera of the driver assistance system. In other words, the section of the vehicle environment can be determined in such a way such that the section is located in a region of a target vehicle, if the size of the target vehicle is smaller than a first threshold value. In this way, the section of the vehicle environment can be easily and effectively determined by means of a comparison of sizes.

According to another exemplary embodiment of the invention, the driver assistance system is configured to analyze a size of a road sign in an image recorded by the camera and to determine the section in such a way that the section is located around the road sign, if the size of the road sign is smaller than a second threshold value.

The same features and advantages can apply to this exemplary embodiment as they are described with reference to the above exemplary embodiments relating to the determination of the section around a target vehicle.

According to another exemplary embodiment of the invention, a 4-Megapixel imager is used for the driver assistant system. In this case, the resolution of the images of the first type can be between 10 and 15 pixels per degree, e.g. pixel pixels per degree, and the resolution of the images of the second type can be between 25 and 30 pixels per degree, e.g. 30 pixels per degree.

A further aspect of the invention relates to a vehicle comprising a driver assistance system according to any one of the preceding aspects.

In the context of the invention, the vehicle may be a road vehicle. For example, the vehicle can be a motor vehicle, an automobile, a truck or a bus.

It has to be noted, that the features and advantages described with reference to the driver assistance system can also characterize the vehicle with the driver assistance system.

A further aspect of the invention relates to a method for recording images for a driver assistance system of a vehicle. The method comprises the steps of recording images of a first type of a vehicle environment in a first recording mode and recording images of a second type of only a section of the vehicle environment in a second recording mode. Moreover, the method comprises the step of automatically switching between the first recording mode and the second recording mode. Furthermore, the images of the second type are recorded with a higher resolution than the images of the first type.

The method described in the context of the present invention can be carried out by the driver assistance system described herein. The steps of the method can be carried out in the described order, in another order, or parallel to each other. Moreover, the method can also comprise further steps which are described with reference to the driver assistance system.

A further aspect of the invention relates to a program element, which, when it is carried out by a processor, instructs the processor to carry out a method described in the context of the invention.

The program element can for example be an executable that is configured for being loaded in a driver assistance system of a vehicle. Moreover, the program element can also refer to an update, which enables an already existing program element to carry out the method described in the context of the invention.

Another aspect of the invention relates to a computer-readable medium, on which a program element is stored, which, when it is carried out by a processor, instructs the processor to carry out a method described in the context of the invention.

The computer-readable medium can for example relate to a floppy disk, a CD, a DVD, a USB stick, a hard drive, a network server, or any other medium on which a program element can be stored.

The gist of the invention may be seen in providing a driver assistance system with a camera for recording images with variable resolution. In the standard operation mode, the camera is configured to iteratively switch between recording images of a first type and images of a second type with a higher resolution than the images of the first type. In this way, the images of the first type can be used for analyzing a close-range of the vehicle environment without requiring too much computing power. Moreover, the images of the second type are provided with a sufficient resolution for analyzing distant areas (around the vanishing point) of the vehicle environment.

The aspects described above and further aspects, features and advantages of the invention may also be found in the exemplary embodiments which are described in the following with reference to the appended drawings.

The figures can be schematically drawn and do not need to be true to scale. If the same reference signs are used in the following description with reference to different figures, the reference signs may refer to similar elements. However, similar elements may also be referenced by different reference signs.

DETAILED DESCRIPTION OF EXAMPLE EMBODIMENTS OF THE INVENTION

Figure 1:
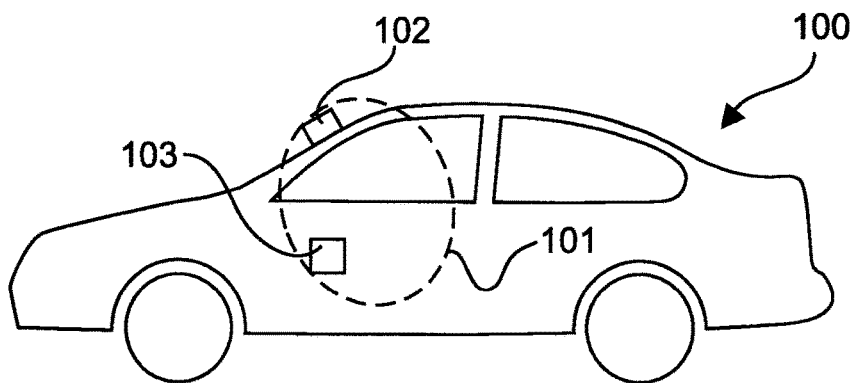
FIG. 1 shows a vehicle with a driver assistance system according to an exemplary embodiment of the invention.
Figure 2A:
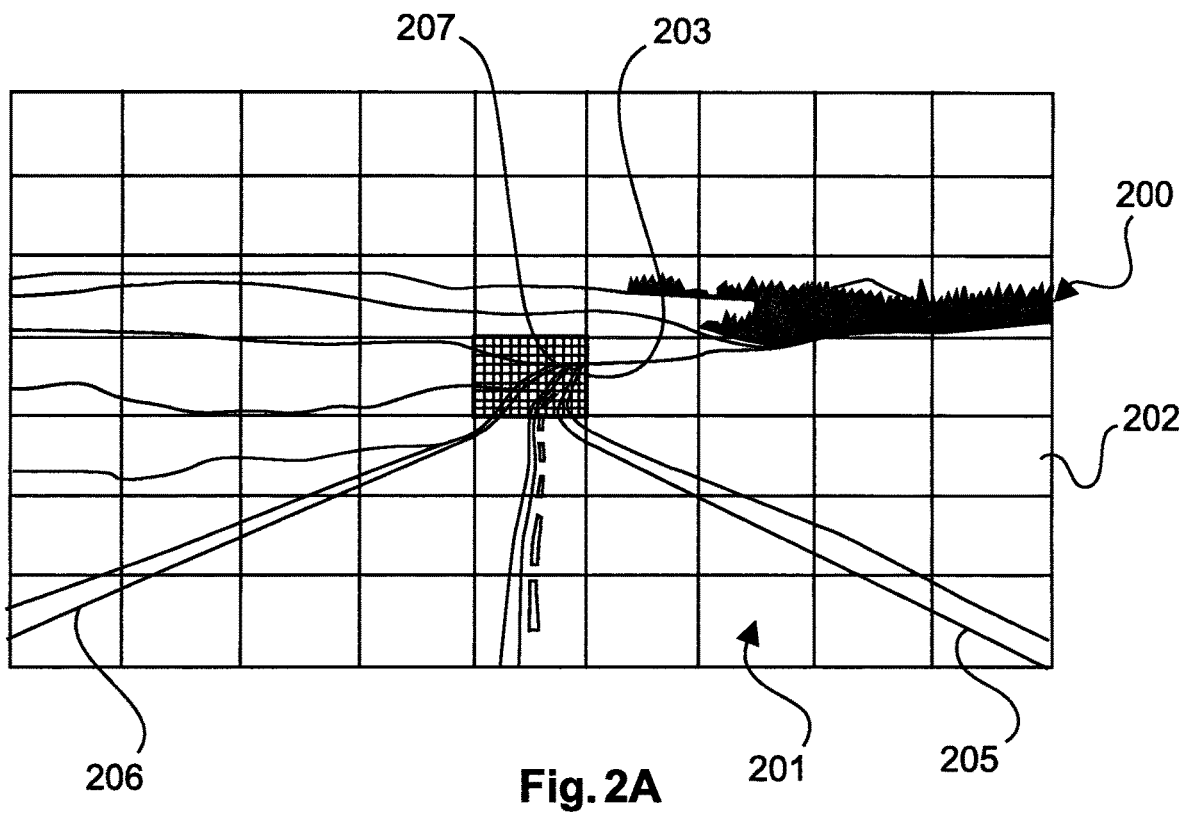
FIG. 2A shows an image of the first type according to an exemplary embodiment of the invention.
Figure 3:
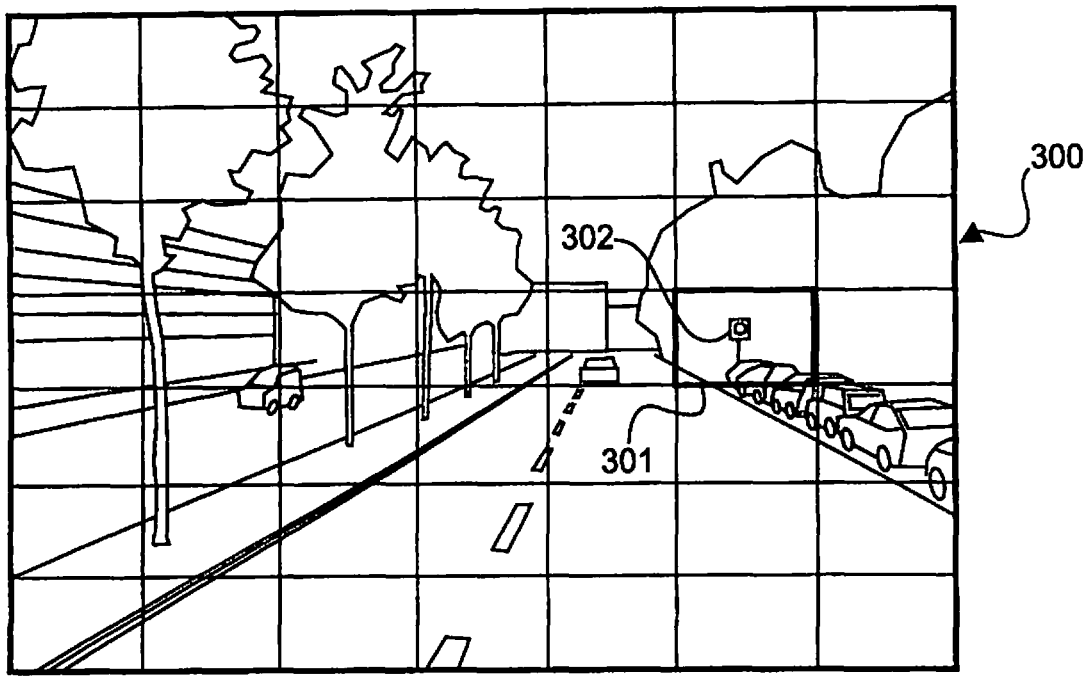
FIG. 3 shows an image of the first type according to an exemplary embodiment of the invention.

In FIG. 1, a vehicle 100 with a driver assistance system 101 is shown. The driver assistance system 101 comprises a camera 102 and a control unit 103. The camera 102 is configured for recording images of a vehicle environment 100 and is configured as forward-looking camera. Moreover, the camera is configured for recording images of a first type of the vehicle environment in a first recording mode. For example, such images of the first type are shown in FIGS. 2A and 3. Moreover, the camera is configured for recording images of a second type of only a section or multiple sections of the vehicle environment in a second recording mode. Moreover, the images of the second type are recorded by the camera in a higher resolution than the images of the first type. The camera is furthermore configured to automatically switch between the first recording mode and the second recording mode. In other words, the camera is configured to automatically switch between the first recording mode and the second recording mode. For example, the camera 102 can be configured such that not more than every 3rd image recorded is a second image. For achieving this, the camera 103 is configured to record the images of the first type as binned images and is structured as described with reference to FIG. 4.

In FIG. 2A, an image of the first type 200 of a vehicle environment 201 of the vehicle according to an exemplary embodiment of the invention is shown. The image of the first type 200 is for example recorded by the camera 102 of the driver assistance system 101 described with reference to FIG. 1.

The image of the first type 200 is overlaid with a grid 202 comprising a plurality of grid cells. Furthermore, the driver assistance system is configured for selecting at least one of the grid cells of the grid 202 for recording an image of the second type of a section of the vehicle environment. For example, the driver assistance system selects the grid cell 203 for recording the image of the second type of the section of the vehicle environment, i.e. the grid cell 203 represents the section of the vehicle environment. In other words, by selecting the grid cell 203, the driver assistance system selects a section of the vehicle environment. Thus, the selected grid cell 203 can refer to the section of the vehicle environment 201.

For example, the driver assistance system can determine the vanishing point 207 of the road recorded in the image of the first type 200 and select the grid cell 203 in such a way that it is located around the vanishing point of the road. This vanishing point 207 can be determined by analyzing the borders 205 and 206 of the road. Alternatively, the driver assistance system can also analyze the size of a target vehicle or of a traffic sign and select the grid cell 203 in such a way is located around the target vehicle or the road sign, if the size of the target vehicle or the road sign is below a threshold value.

Figure 2B:
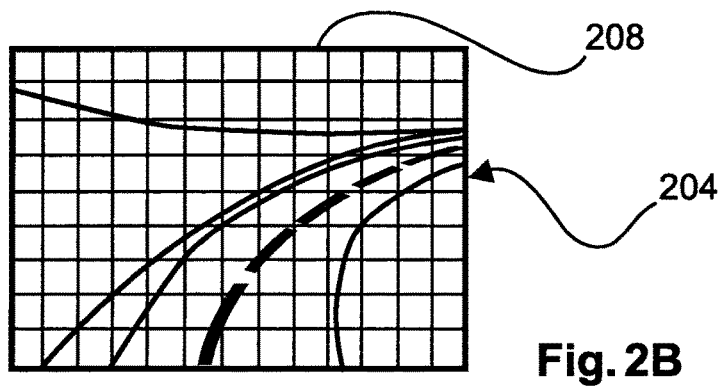
FIG. 2B shows an image of the second type according to an exemplary embodiment of the invention.

In FIG. 2B, an image of the second type 204 recorded by the camera of the driver assistance system shown in FIG. 1 is shown according to an exemplary embodiment of the invention. The image of the second type 204 is an image of the determined section and/or selected grid cell 203 shown in FIG. 2A. The image of the second type 204 is recorded with a higher resolution than the image of the first type 200 such that the far-range of the vehicle environment can be properly analyzed.

Just as an illustrative example, the resolution of the image of the first type 200 is represented by the grid 202 and the resolution of the image of the second type 204 is represented by the grid 208. Thus, the resolution of the image of the second type 204 is higher than the resolution of the image of the first type 200.

In FIG. 3, an image of the first type 300 of another vehicle environment recorded by the camera of the driver assistance system shown in FIG. 1 is shown. Furthermore, it is shown that the image of the first type 300 is overlaid with a grid and that the grid cell 301 comprising a traffic sign 302 is selected for the recording of the image of the second type. In other words, the image of the second type only comprises the selected section and/or grid cell 301.

In other words, the binned image as shown in FIG. 2A and FIG. 3 is used to obtain information from the close/near-range of the vehicle environment for the driver assistance system. Moreover, every few frames images of the second type with a higher resolution, i.e. information from the full resolution imager, can be obtained and used to zoom into some features or targets in one small area of the image. FIG. 2b is for example used for looking into a far end of the road. The driver assistance system can also automatically decide to focus on other objects such as traffic signs shown in FIG. 3 and to use the full resolution information from that part of the image 301 to resolve such objects.

Figure 4:
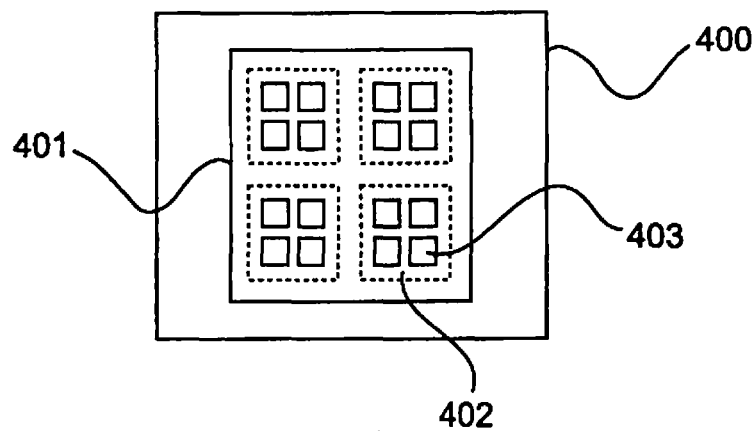
FIG. 4 shows a camera of a driver assistance system according to an exemplary embodiment of the invention.

In FIG. 4, a camera of a driver assistance system according to an exemplary embodiment is shown. The camera comprises an image sensor 401, for example a CCD or CMOS sensor, comprising a plurality of pixels 403. The pixels 403 are arranged into groups 402, such that each group comprises four pixels according to this exemplary embodiment. However, the groups of the imaging sensor 401 can also comprise different numbers of pixels. For recording the images of the first type, the camera 400 is configured to jointly evaluate the data of the pixels 403 for each group. In other words, the image data of the pixels 403 can be merged for each group. For recording the images of the second type, the pixels 403 of the groups 402 recording the images of the second type are separately read out. For example, a particular group 402 is used for recording the section of the vehicle environment such that all four pixels of this particular group 402 are separately individually read out for recording the second image.

It has to be noted that according to this exemplary embodiment, a simple image sensor 401 with a very few number of pixels is shown for illustrating the principle underlying this exemplary embodiment. However, the image sensor can also comprise a much higher number of pixels and groups.

Figure 5:
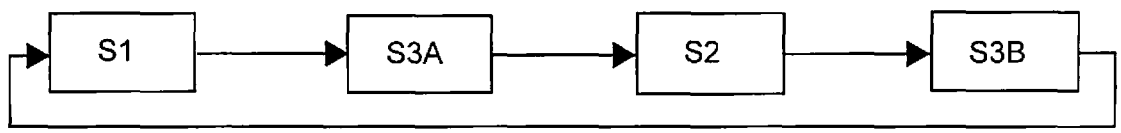
FIG. 5 shows a flow-chart of a method according to an exemplary embodiment of the invention.

In FIG. 5, a flow-chart for a method for recording images for a driver assistance system of a vehicle according to an exemplary embodiment is shown. The method comprises the step S1 of recording images of a first type of a vehicle environment in a first recording mode and the step S2 of recording images of a second type of only a section of the vehicle environment in a second recording mode. Moreover, the method comprises the step S3A of automatically switching from the first recording mode S1 to the second recording mode S2, and the step S3B of automatically switching from the second recording mode S2 to the first recording mode S1. Moreover, the images of the second type are recorded with a higher resolution than the images of the first type.

In the claims, the word "comprising" does not exclude other elements or steps and the indefinite article "a" or "an" does not exclude a plurality. The mere fact that certain measures are recited in mutually different dependent claims does not indicate that a combination of these measures cannot be used to advantage. The reference numerals in the claims are not intended to restrict the scope of the claims.

The invention claimed is:

1. A driver assistance system for a vehicle, the driver assistance system comprising:
a camera that has a variable or dynamic sensor resolution, and that is configured to record images of a vehicle environment;
wherein the camera is configured to record images of a first type of the vehicle environment in a first recording mode;
wherein the camera is configured to record images of a second type of a section of the vehicle environment in a second recording mode, wherein the section of the vehicle environment recorded in the images of the second type is of a smaller area of the vehicle environment compared to a larger area of the vehicle environment recorded in the images of the first type;
wherein the images of the second type are recorded at a higher resolution than the images of the first type, wherein the images of the first type are binned images and the images of the second type are non-binned images;
wherein the camera is configured to automatically switch between the first recording mode and the second recording mode, wherein the camera is configured to iteratively record the images of the first type and the images of the second type according to predetermined intervals;
wherein the driver assistance system is configured to analyze at least one of the images of the first type to determine the section of the vehicle environment;
wherein the driver assistance system is configured to determine a distant area around a vanishing point of the vehicle environment in the at least one of the images of the first type, wherein the distant area is at a far-range of the vehicle environment, and wherein the driver assistance system is configured to locate the section of the vehicle environment around the vanishing point; and
wherein the vanishing point is determined through a determination of a crossing point of an extrapolated border of a road with a horizon recorded by the camera in the at least one of the images of the first type.

2. The driver assistance system according to claim 1, wherein at most every 3rd image recorded by the camera is an image of the second type.

3. The driver assistance system according to claim 1,
wherein the camera comprises an image sensor having a plurality of pixels;
wherein the pixels are arranged into groups, wherein each one of the groups comprises at least a two by two arrangement of the pixels;
wherein the camera is configured to operate in a binned mode to jointly evaluate the pixels of each group for recording the images of the first type; and
wherein the camera is configured to operate in a non-binned mode to separately individually evaluate the pixels of each one of the groups that records the section of the vehicle environment for recording the images of the second type.

4. The driver assistance system according to claim 1, wherein the driver assistance system is configured to analyze the at least one image with an object detection algorithm to determine the section of the vehicle environment.

5. The driver assistance system according to claim 4, wherein the object detection algorithm comprises a pedestrian detection algorithm.

6. The driver assistance system according to claim 1, wherein a resolution of the images of the first type is between 10 and 15 pixels per degree, and a resolution of the images of the second type is between 25 and 30 pixels per degree.

7. A combination comprising a vehicle and the driver assistance system according to claim 1 arranged on the vehicle.

8. A method of recording images for a driver assistance system of a vehicle, the method comprising the steps:

recording images of a first type of a vehicle environment in a first recording mode with a forward looking camera having a variable or dynamic sensor resolution;

recording images of a second type of only a section of the vehicle environment in a second recording mode with the camera, wherein the section of the vehicle environment recorded in the images of the second type is of a smaller area of the vehicle environment compared to a larger area of the vehicle environment recorded in the images of the first type;

automatically switching between the first recording mode and the second recording mode wherein the camera is configured to iteratively record the images of the first type and the images of the second type according to predetermined intervals;

wherein the images of the second type are recorded at a higher resolution than the images of the first type, wherein the images of the first type are binned images and the images of the second type are non-binned images;

analyzing at least one of the images of the first type to determine the section of the vehicle environment;

determining a vanishing point of the vehicle environment by determining a crossing point of an extrapolated border of a road with a horizon recorded by the camera in the at least one of the images of the first type; and determining a distant area around the vanishing point of the vehicle environment in the at least one of the images of the first type, wherein the distant area is at a far-range of the vehicle environment, and locating the section of the vehicle environment around the vanishing point.

9. A program element, which is an executable that is stored in a non-transitory computer-readable medium and is configured to be loaded in a driver assistance system of a vehicle, and which when executed by a processor, instructs the processor to carry out the method according to claim 8.

10. A non-transitory computer-readable medium on which is stored a program element, which, when executed by a processor, instructs the processor to carry out the method according to claim 8.

11. A method of recording images of an environment outside of a vehicle, comprising steps:
   a) with a camera of the vehicle, performing first recording of one or more binned first images with a first resolution of a first area of the environment;
   b) with a driver assistance system of the vehicle, analyzing at least one of the one or more binned first images to determine a vanishing point in the environment as a crossing point at which an extrapolated border of a road in the environment crosses a horizon in the environment;
   c) with the driver assistance system, in the at least one of the one or more binned first images, selecting a second area of the environment around the vanishing point, wherein the second area is smaller than the first area; and
   d) with the camera, performing second recording of one or more non-binned second images with a second resolution of the second area of the environment, wherein the second resolution is higher than the first resolution.

12. The method according to claim 11, further comprising automatically iteratively repeating steps a) to d).

* * * * *

UNITED STATES PATENT AND TRADEMARK OFFICE
CERTIFICATE OF CORRECTION

PATENT NO. : 10,757,330 B2
APPLICATION NO. : 16/077896
DATED : August 25, 2020
INVENTOR(S) : Mina Ashrafi Page 1 of 1

It is certified that error appears in the above-identified patent and that said Letters Patent is hereby corrected as shown below:

On the Title Page

Item [57], ABSTRACT,
Delete and replace the Abstract to read as follows:
--A vehicle's driver assistance system includes a camera configured to record images with variable resolution. In the standard operation mode, the camera is configured to iteratively switch between recording lower-resolution images of a first type and higher-resolution images of a second type. The images of the first type can be used for analyzing a near-range of the vehicle environment without requiring too much computing power. The images of the second type have a sufficient resolution for analyzing a far-range of the vehicle environment.--;

In the Specification

Column 2,
Line 46, after "10", insert --m,--;

Column 3,
Line 25, after "type", insert --.--;

Column 6,
Line 36, after "e.g.", replace "pixel pixels" with --10 pixels--;

In the Claims

Column 11,
Claim 8, Line 12, after "second recording mode", insert --,--.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*